United States Patent [19]

Gines

[11] Patent Number: 4,988,262

[45] Date of Patent: Jan. 29, 1991

[54] EXTENDED REACH SHUTTLE

[75] Inventor: Paul K. Gines, Bountiful, Utah

[73] Assignee: Eaton Corporation, Cleveland, Ohio

[21] Appl. No.: 383,491

[22] Filed: Jul. 24, 1989

[51] Int. Cl.[5] .................. B65G 1/04

[52] U.S. Cl. .................. 414/749; 414/282; 414/662

[58] Field of Search .................. 414/749, 282, 662, 663

[56] References Cited

U.S. PATENT DOCUMENTS

| | | | |
|---|---|---|---|
| 3,050,205 | 8/1962 | Coash et al. | 414/663 |
| 3,154,025 | 10/1964 | Worthington | 414/541 X |
| 3,549,025 | 12/1970 | Messner | 414/282 |
| 3,556,329 | 1/1971 | Johnston et al. | |
| 3,934,741 | 1/1976 | Wentz | |
| 4,388,033 | 6/1983 | Pipes | 414/282 |
| 4,577,486 | 3/1986 | Baba | 414/749 X |
| 4,671,730 | 6/1987 | Gateau | 414/541 X |
| 4,778,328 | 10/1988 | Apgar | 414/541 |

FOREIGN PATENT DOCUMENTS 2335110 1/1974 Fed. Rep. of Germany .

*Primary Examiner*—Frank E. Werner
*Assistant Examiner*—William M. Hienz
*Attorney, Agent, or Firm*—F. M. Sajovec

[57] ABSTRACT

A double reach shuttle assembly for a storage and retrieval machine. Latch mechanisms are provided on the movable elements of the shuttle to control the sequence of extension of the movable elements thereby reducing the amount of space required beneath a load in a storage rack to accommodate the shuttle elements when the double reach shuttle is used in a single reach mode. As the shuttle extends, each movable element remains stationary until the element above it reaches a predetermined point relative thereto. The invention further provides additional latch mechanisms which insure that the load carrying element of the shuttle is the last to retract.

5 Claims, 4 Drawing Sheets

EXTENDED REACH SHUTTLE

The present invention relates generally to shuttles for use on stackers and other material handling equipment and more particularly to a shuttle of the type having multiple extending sections adapted for use in extremely deep storage bays.

Extended reach, or double reach shuttles, are generally known in the art relating to material handling equipment, as illustrated by U.S. Pat. No. 4,388,033, assigned to the assignee of this application. In a typical warehousing system in which such apparatus is used, a stacker vehicle is horizontally movable in an aisle between storage racks which define a plurality of storage bays on either side of an aisle. In order to remove articles from the storage bays and replace them therein, the stacker vehicle is equipped with a vertically movable load carriage having a laterally movable load support or shuttle assembly mounted thereon, the shuttle assembly including an end element which is extendable into a storage bay to either place a load therein or extract a load therefrom. In many cases, the storage bays are extremely deep (so called double deep storage), requiring a shuttle assembly having multiple extending elements and being able to extend several times its collapsed length to reach articles which are stored double deep, as well as those stored single deep.

While a double reach shuttle can be only partially extended to reach single deep loads, there are certain inefficiencies associated with existing shuttles operated in this manner. More specifically, existing double reach shuttle designs incorporate a plurality of stacked elements linked together by a leaf chain and pulley drive system, such that all the elements move generally uniformly outwardly when the shuttle is extended. When the shuttle is extended to double deep length, all of the movable elements are required to be inserted into the storage bay in order for the load carrying element to be in position to engage a load. Because of the uniform extension of the elements, when a double reach shuttle of current design is used to access a single deep load by only partially extending the shuttle assembly, all of the elements will also enter the storage bay when the load carrying element is positioned under a load, which means that the same space must be left open under a single deep load to accommodate such elements as is required for a double deep load. This added space represents lost storage space, which reduces the space utilization efficiency of a system which is operated in this manner.

It is thus an object of the present invention to provide a shuttle assembly which can be used to efficiently access both single deep and double deep loads.

A more particular object of the invention is to provide such a system wherein the access space required for the insertion of a double reach shuttle beneath a single deep load is essentially the same as that required for a single reach shuttle, and substantially less than that required to access the same load with a double deep shuttle.

To meet the above objectives the present invention provides a double reach shuttle in which the extension of the various stacked table elements is controlled such that in the single reach mode only the end table element and part of the next one extends into the storage bay, thus significantly decreasing the space which must be provided beneath single deep loads. More specifically, the invention provides a shuttle assembly system which incorporates a system of latches between the shuttle elements which maintain each of the elements in its unextended, stacked relationship until the preceding element has reached at least the midpoint of its extension. In accordance with another aspect of the invention, a second latch system is provided which insures that the load carrying element of the shuttle is the last of the movable elements to be retracted.

Other objects and advantages of the invention will be apparent from the following description when considered in connection with the accompanying drawings, wherein:

FIGS. 1*a* and 1*b* are schematic representations of the shuttle elements of a prior art shuttle in their single reach and double reach configurations;

FIGS. 2*a* and 2*b* are schematic representations of the shuttle elements of the present invention in their single reach and double reach configurations.

Figure 1B:
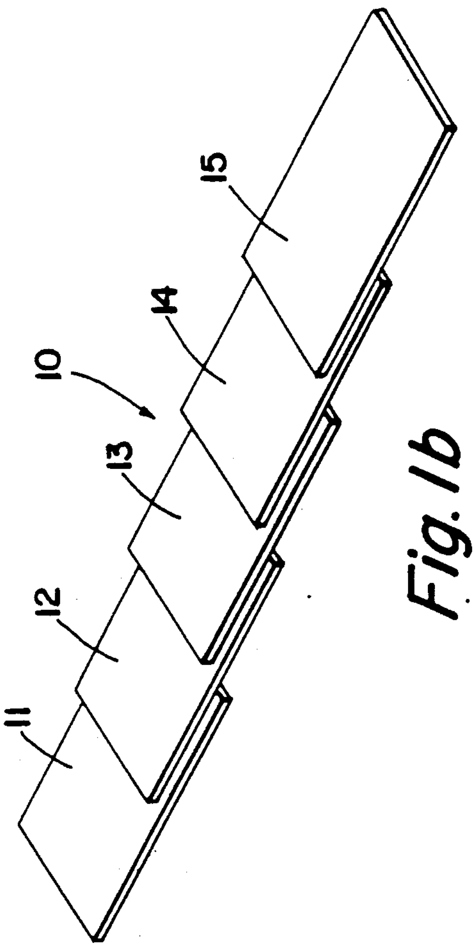
Fig. 1b PRIOR ART
Figure 1A:
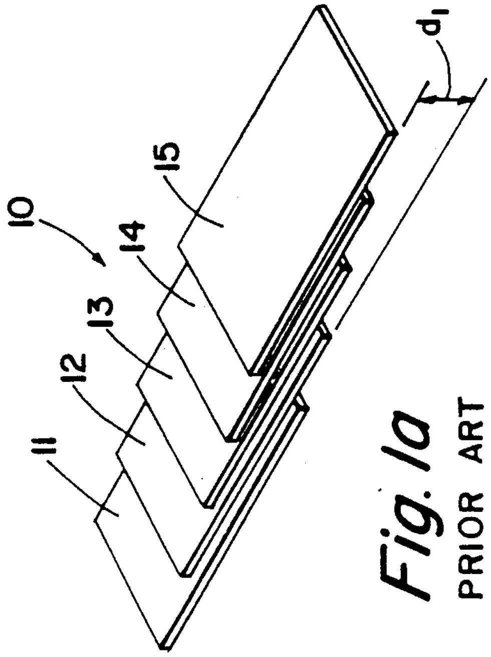
Fig. 1a PRIOR ART

Referring to FIGS. 1*a* and 1*b*, there is illustrated schematically a prior art shuttle assembly, designated generally by the numeral 10, which comprises a base element 11, intermediate elements 12, 13 and 14, and a load carrying element 15. FIG. 1*a* illustrates the conditions wherein the shuttle assembly is only partially extended such as it would be to access "single deep" loads, i.e. loads stored in a rack adjacent the aisle. FIG. 1*b* illustrates the condition wherein the shuttle is fully extended to access "double deep" loads, i.e. loads stored at a significant depth within the rack structure.

Figure 2B:
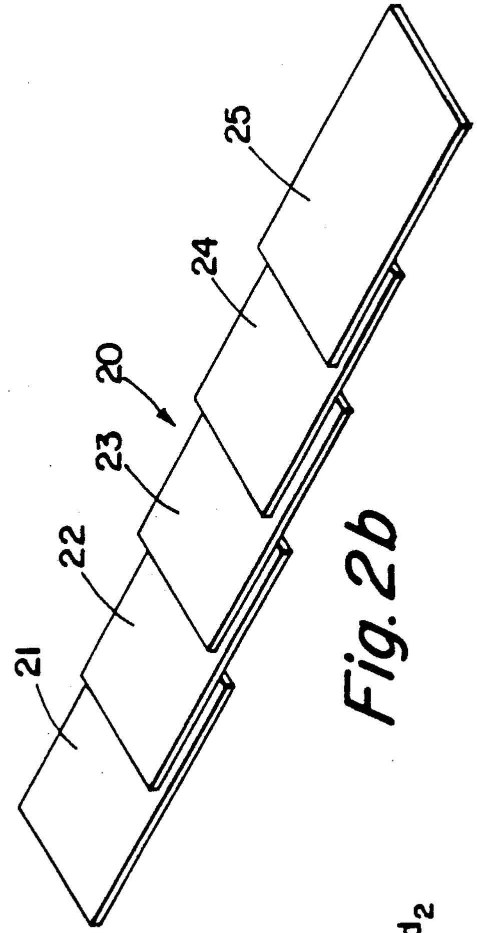
Figure 2A:
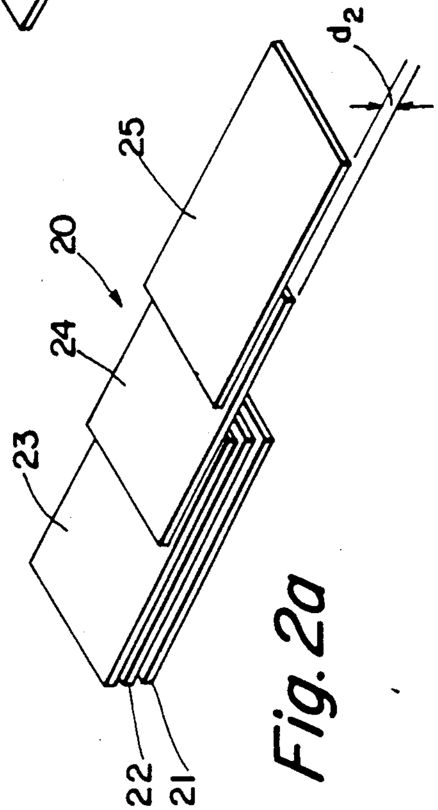

FIGS. 2*a* and 2*b* are schematic representations of a shuttle assembly, designated generally by the numeral 20, which is constructed in accordance with the present invention; comprising a base element 21, intermediate elements 22, 23 and 24, and a load carrying element 25. Comparing FIGS. 1*b* and 2*b*, it can be seen that in their fully extended configurations the prior art shuttle assembly 10 and the present shuttle assembly 20 are essentially the same insofar as the relationships among their individual elements. In comparing FIGS. 1*a* and 2*a*, however, it can be seen that when the prior art assembly 10 is only partially extended, each of the movable elements 12–15 extends substantially equally such that when the load carrying element 15 is within the single deep portion of the rack structure, space must be left for the added depth "$d_1$", of all the intermediate elements; whereas when the present assembly 20 is partially extended the individual elements move separately such that only the added depth $d_2$ of the uppermost intermediate element 24 must be accommodated.

Figure 3:
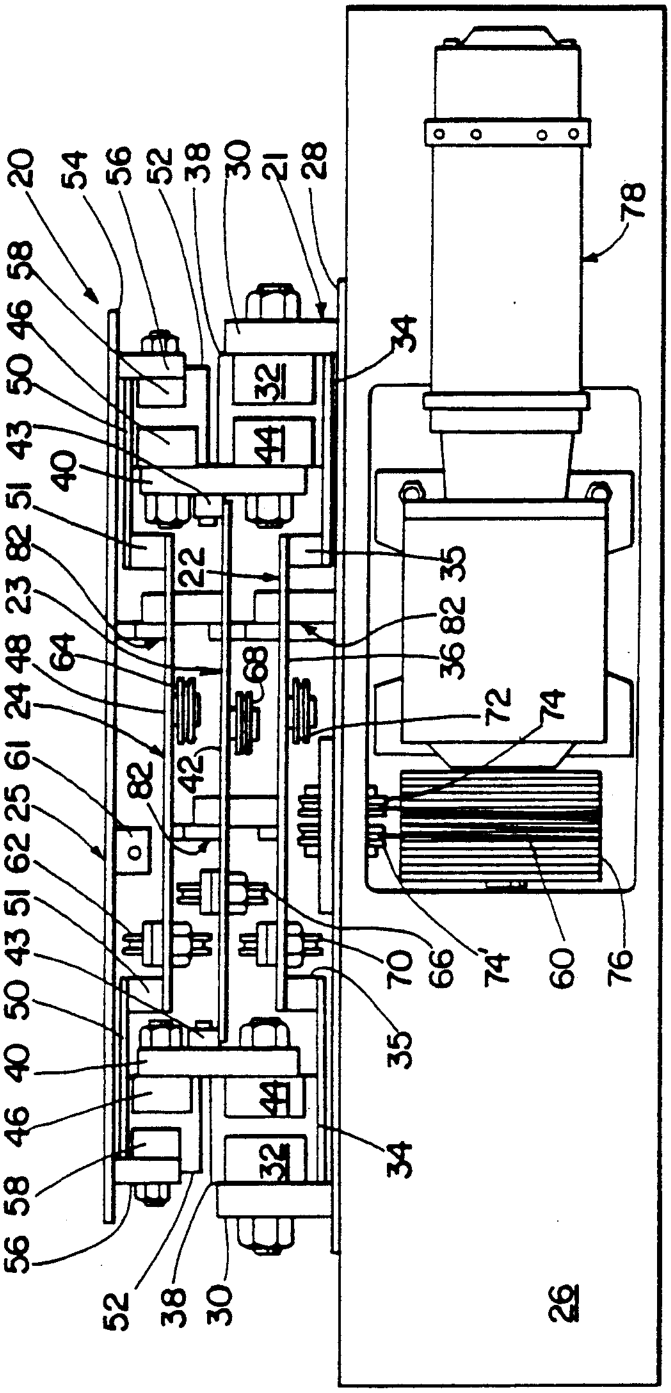
FIG. 3 is an end elevation view of a shuttle incorporating the invention.

Referring to FIG. 3, the base member 21 of shuttle assembly 20 is supported by frame members 26 and 27 which form part of the elevating carriage of a storage and retrieval machine (not shown). Such elevating carriages and their associated storage and retrieval machines are well known in the art, and will not be described herein in detail. The base element 21 comprises a base plate 28 attached to the frame members 26 and 27, elongated bearing supports 30 upstanding from the base plate, and a plurality of rollers 32 distributed along the longitudinal dimension of the supports 30, and mounted for rotation thereon.

The first intermediate element comprises first and second base members 34 spaced apart across the longitudinal centerline of the shuttle assembly, spacers 35 upstanding from the base members, a plate 36 attached to the spacers, and elongated channel members 38 attached to the base members 34 and supported by the rollers 32 of the base element.

Intermediate element 23 comprises a pair of elongated plates 40 spaced apart across the longitudinal centerline of the shuttle assembly; a plate 42 received between the plates 40 and attached thereto through spacer bars 43 attached to the plate; a first set of rollers 44 mounted for rotation on each of the plates 40 and distributed along its length, the rollers 44 being supported by the channel members 38; and a second set of rollers 46 similarly mounted on the plates 40.

Intermediate element 24 comprises a central plate 48, side plates 50 attached to the central plate by means of spacer bars 51, and channel members 52 depending from and attached to the side plates 50, the channel member being supported on the rollers 46.

Load carrying element 25 comprises a load plate 54, a pair of elongated bars 56 attached to the load plate, and a plurality of rollers 58 attached to each of the bars 56 and supported by the channel member 52.

Figure 4:
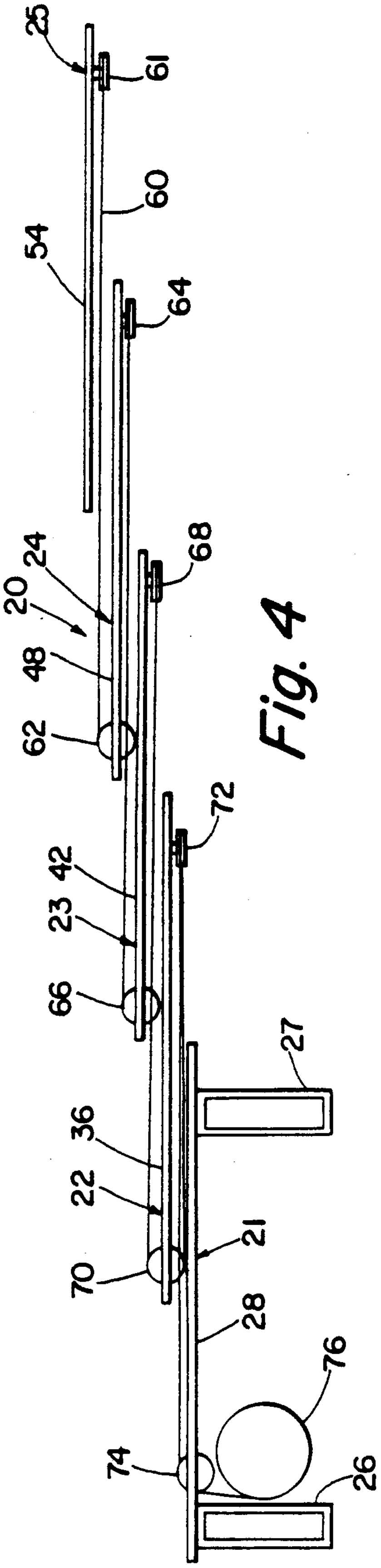
FIG. 4 is a schematic side elevation view of a fully extended shuttle.

The shuttle assembly 20 is extended and retracted by a cable and pulley system, which in the interest of clarity is only partially illustrated in FIG. 3. FIG. 4 illustrates the reeving system for retracting the shuttle assembly from its fully extended position to the right as viewed therein and for extending to the left. One end of a cable 60 is fixed to the outer end of the load plate 54 at an anchor point 61. The cable is routed around a first pulley 62 rotatably mounted on the inner end of plate 48 of intermediate element 24, extends outward where it is routed around a second pulley 64 at the outer end of plate 48, and extends inwardly again where it is routed around a third pulley 66 on plate 42 of intermediate element 23. In like manner to the above, the cable is routed around a fourth pulley 68 on plate 42, around fifth and sixth pulleys 70 and 72 on plate 36 and then around a seventh pulley 74 on the base plate 28 to a drum 76. The drum 76 is mounted on the output shaft of a drive motor and gear assembly 78 mounted on the frame member 26. When the drum 76 is rotated counterclockwise as shown in FIG. 4, the force applied by the reaving system on the shuttle elements will eventually result in all the elements being stacked one above another in a fully retracted position. A latch system of the invention insures that the load carrying element 25 is retracted last as will be described in detail below. Further counterclockwise rotation of the drum will cause the shuttle assembly to extend to the left as viewed in FIG. 4, which extension will be in a particular sequence, as provided by the latch assembly of the present invention, as will be described in detail below.

To provide extension of the shuttle assembly to the right as viewed in FIG. 4 and to retract it from a leftward extended position, the opposite end of cable 60 is reeved over a second set of pulleys substantially identical to that described above but oppositely disposed; on the shuttle elements. More specifically, After the rope 60 is attached at 61 and reeved over the pulleys as described above, it extends over a second idler pulley 74', is reeved over the second set of pulleys on the stationary and movable elements and is fastened to the opposite end of the element 25. The rope is always played out from one side of the drum 76 and taken up on the other side in equal amounts, the idler pulleys floating back and forth on their axle to allow the turns wound about the drum to move from side to side on the drum as the shuttle assembly is extended in one direction or the other.

Figure 6:
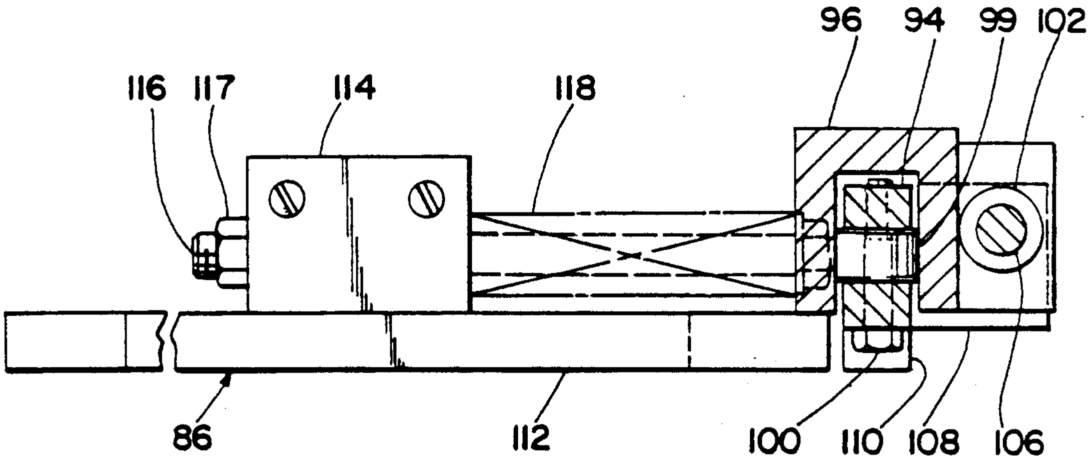
FIG. 6 is a section view taken at line 6—6 of FIG. 5.
Figure 5:
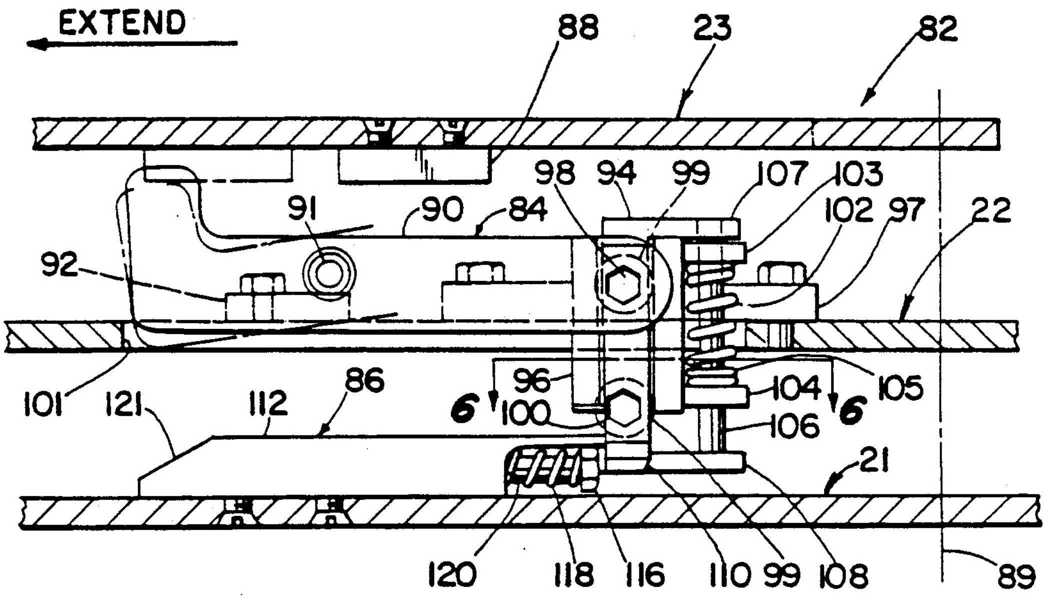
FIG. 5 is a side elevation view, partly in section, of a latch assembly of the invention.
Figures 7, 8:
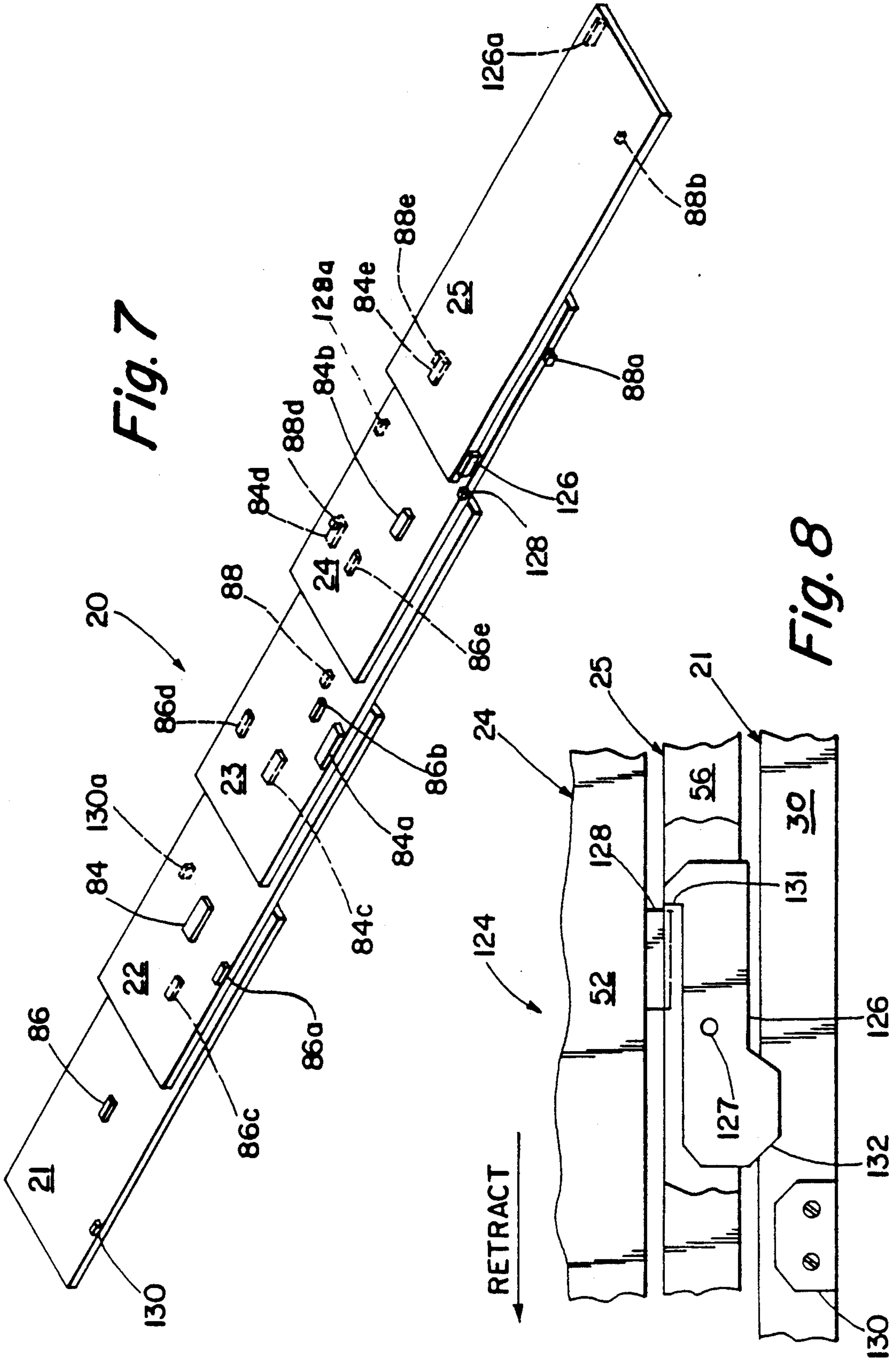
FIG. 7 is a schematic illustration showing the relative positions of the latch assemblies of the invention.
FIG. 8 is a fragmentary plan view illustrating a return latch assembly of the invention.

Referring to FIGS. 5, 6 and 7 there is illustrated a typical latch assembly 82 operable to sequentially extend the shuttle 20 of the present invention. FIG. 5 illustrates one latch assembly 82 which is operable to prevent intermediate element 22 from extending until intermediate element 23 has extended past the centerline of element 22. It will be understood that there are three identical latch assemblies for each direction of extension, one to control the extension of each of the intermediate elements 22, 23 and 24 to the right as illustrated in FIG. 7, and one to control the extension of each of the intermediate elements to the left. For purposes of illustration only one of the six assemblies is shown in detail in FIGS. 5 and 6, it being understood that all are identical.

In FIGS. 5 and 6, the latch assembly 82 is illustrated as applied to intermediate element 22, and comprises a latch mechanism 84 attached to the element 22, a stop block 86 attached to the element 21, and an actuator bar 88 attached to the element 23. The elements are depicted as they are illustrated in FIG. *2a*, with elements 24 and 25 extended, and the remaining elements in stacked relation, the centerline of the stacked elements being shown at 89 in FIG. 5.

The latch mechanism comprises an actuator lever 90 which is pivotally mounted on an axle 91 welded to a bracket 92 which is bolted or otherwise attached to the element 22; and a latch bar 94 pivotally attached to the lever 90. The latch bar 94 is received for linear movement within a channel member 96 welded or otherwise fixed to a bracket 97 bolted to the element 22. The lever 90 is attached to the latch bar by means of a shoulder bolt 98 which also retains a roller bearing 99 within the latch bar. A second roller bearing 99 is attached to the latch bar by a second shoulder bolt 100, the roller bearings guiding the latch bar for relatively friction-free movement within the channel 96. The latch bar 94 and channel 96 are oriented as shown in FIG. 5 and extend through an opening 101 formed in the element 22 which is elongated to provide clearance for movement of the lever 90 as will be described in further detail below.

The latch bar 94 is spring-loaded to the position shown in FIG. 5 by means of a spring 102 received between ears 103 and 104 extended from and fixed to the side of channel 96. The spring 102 acts between the upper ear 103 and a retaining ring 105 placed on a shaft 106 which is retained between legs 107 and 108 fixed to the latch bar 94 and extends through bearings in the ears 103 and 104. The latch bar 94 extends downward in position to contact the stop block 86, and as shown in FIG. 6 includes a projecting portion 110 which will be described in further detail below.

The stop block 86 comprises a solid bar 112 welded or otherwise attached to a spring block 114 which is attached to the plate 21. A bolt 116 is slidingly received in a bore formed in the spring block parallel to the bar 112, and is retained by a nut 117. A compression spring 118 is received over the bolt, and acts between the block 114 and the head of the bolt. The head of the bolt 116 defines the stop member of the stop block, and is thus positioned to be contacted by the latch bar 94. As shown in FIGS. 5 and 6, the bar 112 is cut away at 120 to provide clearance for the extension 110 when the spring is compressed upon contact by the latch bar. A ramp 121 is formed on the end of the bar opposite the bolt head, as will be described in further detail below.

The actuator bar 88 comprises a sold block attached to the underside of element 23 in position to contact the lever 90 as shown in FIG. 5.

When the shuttle assembly is extended, each of the movable elements 22–25 will tend to extend uniformly; however, the actual extension sequence will be determined by friction forces within the system, such that the element which sees the least resistance will extend until it sees more resistance than another of the elements, which will then extend and so on. In accordance with the present invention each of the movable elements will be restrained from movement until the element above it extends past a predetermined point, thus insuring that the load carrying element 25 extends first, followed by elements 24, 23 and 22. Referring particularly to FIG. 5, the extension of element 22 to the left is illustrated. FIG. 5 illustrates a condition wherein the first three shuttle elements, i.e. the base element 21, and the moveable elements 22 and 23, are in stacked relation, and the elements 24 and 25 have already extended to the left. As the shuttle extension system is operated to further extend the moveable elements to the left, movement of element 22 is blocked by engagement of the latch bar 94 with the spring-loaded stop block 86, the spring 118 being effective to minimize any shock which might be transmitted to a load carried by the shuttle by contact with the stop block. As the upper element 23 moves toward the broken line position of FIG. 5, the actuator bar 88 contacts the lever 90 causing it to pivot counterclockwise about axle 91, and thus moves the latch bar 94 upward until it clears the stop block. At this point element 22 is free to move to its full extension. When the shuttle is retracted back toward the FIG. 5 position it can be seen that the projection 110 of the latch bar will ride up the ramp 121 on the stop block and along the top surface thereof until it drops down behind end of the stop block in the FIG. 5 position. While the projection is in contact with the stop block surface the lever 90 will be in its broken line position, allowing the actuator bar 88 to clear the lever.

As noted above, it can be appreciated that each of elements 22, 23 and 24 has a latch mechanism 84 thereon for each extension direction and that the next above and next below elements have corresponding actuator bars and stop blocks thereon respectively. Referring to FIG. 7 there is schematically illustrated all the latch assemblies required for left and right extension of the shuttle. Thus latch mechanism 84 represents the element 22 left extension latch mechanism shown in FIG. 5, stop block 86 is that shown in FIG. 5, and actuator bar 88 is that shown in FIG. 5. In like manner elements *84a, 86a* and *88a* control leftward extension of shuttle element 23; and elements *84b, 86b* and *88b* control leftward extension of shuttle element 24. Likewise elements *84c, 86c, 88c; 84d, 86d, 88d;* and *84e, 86e, 88e* control rightward movement of shuttle elements 22, 23 and 24 respectively. It can thus be appreciated that when the shuttle assembly 20 is to be extended only to its single reach position as shown in FIG. *2a*, the present invention permits extension of only the load carrying element 25 and the uppermost movable element 24.

When the shuttle assembly is retracted, the actual sequence of retraction of the movable elements is not important, except that the load carrying element 25 must retract last. To insure that this will occur the present invention further provides return latch assemblies as illustrated in FIGS. 7 and 8. Referring to FIG. 8 the return latch assembly for return from rightward extension is designated generally by reference numeral 124. By referring to FIG. 3, it can be seen that the various elements 21–25 which make up the shuttle are not merely a set of flat plates as schematically illustrated in FIGS. 2 and 8, but are a series of built up assemblies nested together to conserve space. Accordingly, when looking at FIG. 8; which is a plan view, in the preferred embodiment of the invention the portion of the elements to which the various portions of the return latch assembly are attached are actually juxtaposed as shown, with bar 56 of the top or load carrying element 25 received between channel member 52 of the next lower intermediate element 24 on one side and bearing support 30 of the base member 21 on the other.

The return latch assembly comprises a return latch lever 126 pivotally mounted on the load carrying element 25, a catch bar 128 fixed to the movable element 24, and a release bar 130 fixed to the base member 21. The lever 126 has a catch element 131 formed at one end which is engageable with the catch bar 128, and a release cam portion 132 at the other end engageable with the release bar 130. Referring also to FIG. 8, when the shuttle is retracted from its rightward extension, movement of the load carrying element 25 relative to element 24 is prevented by engagement of the lever 126 with the catch bar 128 until they approach full retraction and the release cam portion 132 of the lever 126 contracts the release bar, causing the lever to rotate clockwise about pivot 127 and releasing the lever from the catch bar, thus allowing the load carrying element 25 to retract relative to element 24. Referring to FIG. 7, similar elements *126a, 128a* and *130a* and provided for retraction from a leftward extension of the shuttle assembly.

I claim:

1. In a shuttle assembly operable between a retracted condition and an extended condition to move a load, comprising a stationary element; a plurality of elongated elements movable relative to one another in a generally horizontal plane, said movable elements comprising one or more intermediate elements and a load carrying element; and drive means interconnecting said stationary and movable elements and operable to move said movable elements telescopically to extend said load carrying element to a position remote from said stationary element; the improvement comprising interacting means operable to cause said movable elements to move in a predetermined sequence when said shuttle assembly is operated between a retracted condition and an extended condition, the interacting means comprising a stop member on a first of said elements, said first element being either said stationary element or one of said movable elements; a latch attached to a second one of said movable elements adjacent said first element, said latch including a movable member normally engageable with said stop member to prevent relative movement between said first and second elements, a release member connected to said moveable member and operable to disengage said moveable member from said stop member; and a first cam member mounted on a third one of said movable elements adjacent said second element, said first cam member being positioned to engage said release member to move it to a position disengaging said movable member when said third element reaches a predetermined extension relative to said second element wherein the interacting means is operable to cause the second and third elements to extend sequentially starting with the third element, the second element being maintained stationary until the third element reaches the predetermined position wherein all of said elements are disposed in a vertically stacked relationship when said shuttle assembly is in its retracted condition, the load carrying element being the uppermost and the stationary element being the lowermost.

2. Apparatus as claimed in claim 1, including a channel member fixed to said second element, said channel member having parallel bearing surfaces formed thereon; said movable element comprising a bar member received between said bearing surfaces, and anti-friction bearing means mounted on said bar member and in rolling engagement with said bearing surfaces.

3. Apparatus as claimed in claim 1 in which said stop member includes a spring compressible upon engagement by said movable member.

4. Apparatus as claimed in any one of claims 1, 2 or 3, including second interacting means operable to prevent retraction of the load carrying element relative to an adjacent movable element until the load carrying element retracts beyond a predetermined point relative to the stationary element.

5. Apparatus as claimed in claim 4, in which said second interacting means comprises a lever pivotally mounted on said load carrying element, said lever having, a catch surface formed on one side of a pivot point thereof, and a cam follower surface formed at the other side of the pivot point; a second stop member mounted on one of the movable elements adjacent the load carrying element and engageable with said catch surface; and a second cam member mounted on said stationary element and engageable by said cam surface.

* * * * *